United States Patent

[11] 3,540,596

| [72] | Inventors | Cecil W. Bugbee; |
| | | John G. Hicks, Jr., Tampa, Florida |
| [21] | Appl. No. | 787,101 |
| [22] | Filed | Dec. 26, 1968 |
| [45] | Patented | Nov. 17, 1970 |
| [73] | Assignee | Cities Service Company |
| | | New York, New York |
| | | a corporation of Delaware |

[54] FILTER FEED DISTRIBUTOR
8 Claims, 5 Drawing Figs.

| [52] | U.S. Cl. | 210/328, 210/405, 210/456 |
| [51] | Int. Cl. | B01d 33/38 |
| [50] | Field of Search | 210/328, 405, 456, H, F, Digest |

[56] References Cited
UNITED STATES PATENTS

| 701,687 | 6/1902 | Desaulles | 210/396 |
| 2,039,573 | 5/1936 | Weber | 210/456X |
| 2,849,122 | 8/1958 | Roos | 210/328 |

Primary Examiner—Reuben Friedman
Assistant Examiner—Frank A. Spear, Jr.
Attorney—J. Richard Geaman ABSTRACT: An improved slurry distribution box for use with moving bed filters, preferably a tilting pan vacuum filter is disclosed herein. The distribution box is a horizontally mounted box with a flat side transverse to the path of the filter pans, the flat side having a coextensive opening therein and a gate pivotally mounted from the top opposite the opening and acting together with the opening to define a discharge port. Adjustably mounted counterweights are cantilevered from the front of the gate to provide a biasing force to hold the gate against the opening. Preferably the gate is angularly bent at its bottom to provide a slight taper to the discharge port formed by the gate and the opening so as to distribute slurry evenly over the annular filter surface area of the moving filter.

Patented Nov. 17, 1970

INVENTORS
CECIL W BUGBEE
JOHN G. HICKS, JR.
BY
ATTORNEY

Patented Nov. 17, 1970
3,540,596
Sheet 3 of 3
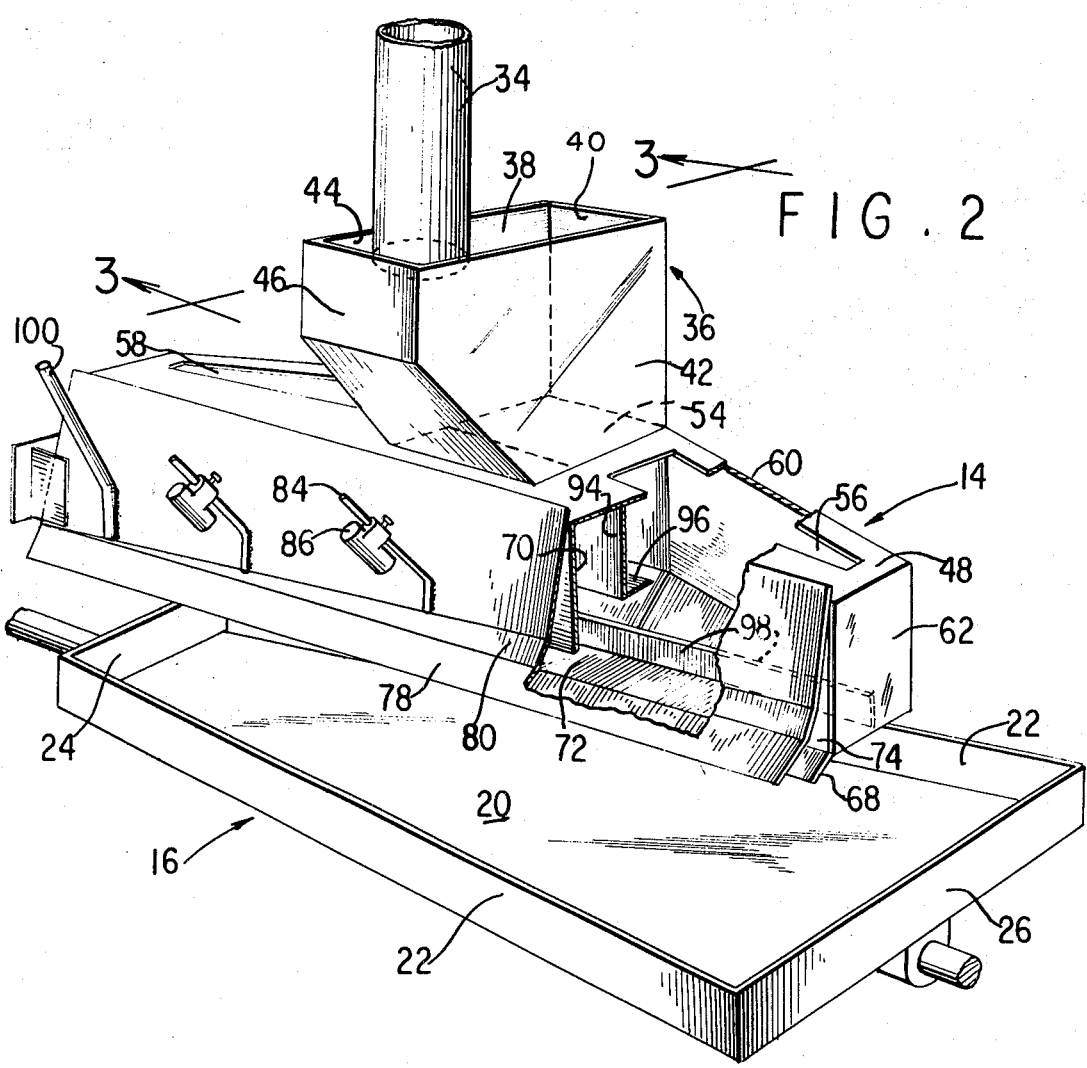
FIG. 2
FIG. 4
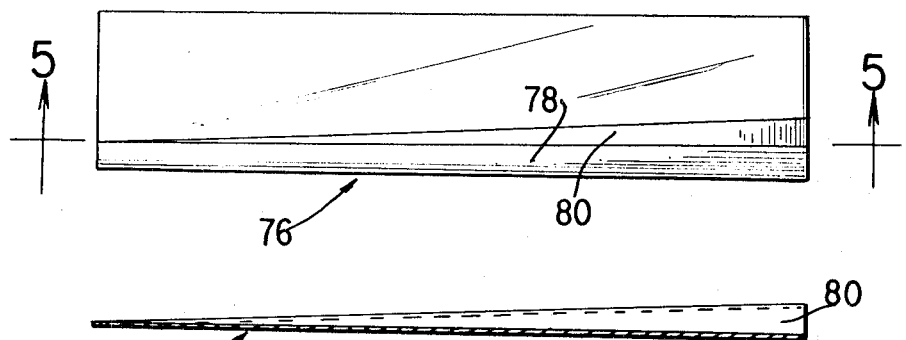
FIG. 5
INVENTORS
CECIL W. BUGBEE
BY JOHN G. HICKS, JR.
ATTORNEY

FILTER FEED DISTRIBUTOR

BACKGROUND OF THE INVENTION

This invention relates to an improved fluid distribution apparatus for use in applications requiring a uniform distribution of a fluid over a flat surface. More particularly this invention is related to an apparatus for uniformly distributing a fluid preferably a slurry over a specified length of surface as the surface moves past the distribution apparatus.

In the chemical process industries many applications require a uniform distribution of a fluid, primarily but not necessarily, a slurry over a surface area. Some examples of such processes where there is a requirement for feeding a slurry uniformly over a specific area are thickeners, floatation cells, and more preferably filters. In these operations it is necessary to distribute fluid as uniformly as possible and with a minimum of velocity over the overall surface area. Numerous devices, too elaborate to describe, are now being used to accomplish such an objective. However, none of them are in themselves completely satisfactory for the accomplishment of more than one particular objective. In the present invention, it is desired to feed a slurry resulting from the sulfuric acid acidulation of phosphate rock uniformly over the filter surface of a plurality of moving filter pans or trays which act to separate phosphoric acid liquor from the solids, principally gypsum, to wash the solids and recycle a portion of the filtrate back to the acidulation process.

An example of a preferred apparatus for accomplishing these objectives is specifically the Bird-Prayon Tilting Pan Vacuum Filter, an example of which is shown on page 19-81 as FIG. 19-25, in Perry's Chemical Engineers Handbook Fourth Edition-McGraw Hill Co., 1963). The slurry from the acidulation is continually fed onto filter as the filter pans pass under the slurry distribution apparatus. The pans are trapezoidal in shape and it is desirable to uniformly distribute this slurry on to the filter pan as it passes underneath the distribution apparatus. A number of devices have been used up to now but they are not completely satisfactory. Overflow weirs have been widely used but they are subject to deposition of solids which cause nonuniform flow. Sprays have also been used, but here again deposition of solids in the multiplicity of spray nozzle have resulted in their blockage.

SUMMARY OF THE INVENTION

Accordingly, we have invented an improved fluid distribution apparatus preferably for use with a rotary tilting pan filter. The distribution apparatus comprises conduit means for feeding slurry to the apparatus, a longitudinally shaped box having a rear wall, adjacent bottom walls, two sidewalls and a front with a discharge opening, a gate pivotally attached to the front of the box adjacent to the opening and forming together with the opening a discharge port, means for biasing the gate with a predetermined and adjustable force whereby the discharge port varies in size in response to the force of fluid impinging upon the gate. Preferably the gate has a tapered discharge port at its bottom which provides uniform distribution of fluid over to the filter surface of a tilting pan filter.

It is therefore an object of the present invention to provide a fluid distribution box which delivers fluid to a filtering surface uniformly.

Another object of this invention is to provide an apparatus for feeding slurry onto a moving filter surface at a uniform rate and at a minimum velocity.

Another object of this present invention is to provide improved apparatus for feeding a variable flow of slurry uniformly onto a filter.

Other objects and advantages of the present invention will be apparent from the brief description of the drawings and the preferred embodiments which follow.

DESCRIPTION OF THE DRAWING

FIG. 2 is a view in perspective of the fluid feed distribution box and a single pan passing underneath.

FIG. 4 is a front view of the distribution box gate.

FIG. 5 is a bottom view of the discharge port with the gate in a closed position.

BRIEF DESCRIPTION OF THE PREFERRED EMBODIMENTS

Figure 1:
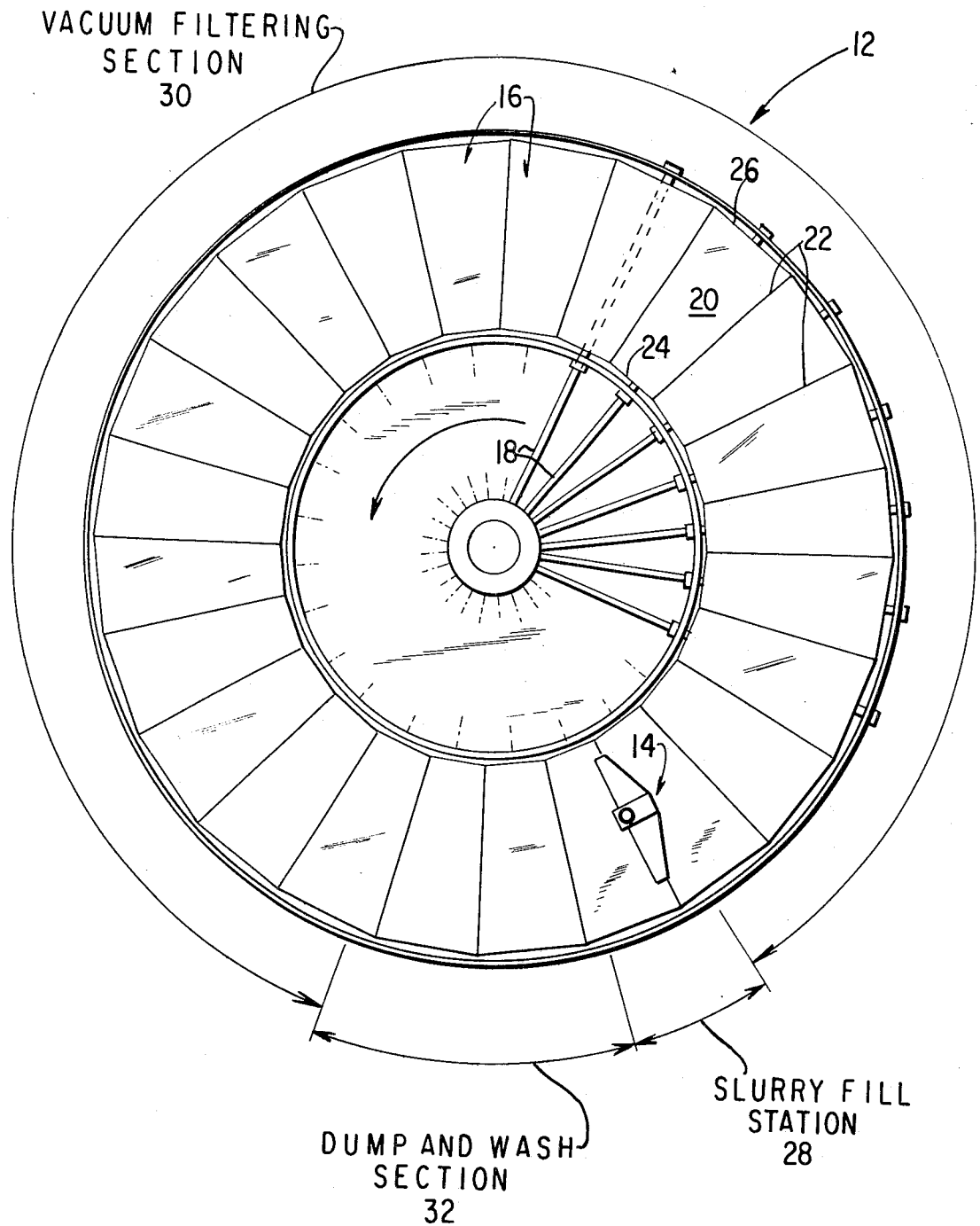
FIG. 1 of the drawing is a plan view of a tilting pan filter.

Referring now to the drawings, a schematic plan view of a tilting pan vacuum filter 12 is shown in FIG. 1 together with a feed distribution box 14 positioned above the filter 12. The filter 12 is constructed of a number of flat pans 16 arranged in a circle, each pan being pivotally mounted on a pipe 18 and carried in a circular horizontal path about the center of the filter by drive means, not shown. Each of the pans 16 is trapezoidal in shape, having a trapezoidal shaped filter surface 20 and four upright walls each located on a side of the trapezoidal filter surface, the two equal length nonparallel walls 22 being adjacent similarly mounted walls on adjacent pans, the short parallel wall 24 being on the side nearest the center of the circle, and the larger parallel wall 26 being on the side of the pan furthest away from the center of the vacuum filter.

In operation slurry resulting from the sulfuric acid acidulation of phosphate rock is pumped to the feed distribution box 14 from a source, not shown, and flows from the box 14 onto the top surface of the filter pans 16 as they pass beneath the box at a slurry fill station 28. The pans in turn pass sequentially through a vacuum filtering section 30, a dump and wash section 32 and back to the slurry fill station, where slurry is again distributed onto the filter surface of the pan.

With reference to FIG. 2 of the drawings wherein the slurry feed distribution box 14 is shown in three dimensional view, with a single filter pan shown moving in position underneath the box. A slurry feed pipe 34 from the wet process acidulation operation, not shown, is connected to the distribution box by a slurry feed conduit 36 having an open top 38. The feed duct 36 is formed from an upright rear wall 40 connected at its side edges to each of two sidewalls 42 and 44, also upright. The edges of each of the sidewalls 42 and 44, adjacent to the rear wall 40 are vertical and form continuous and vertical junctions therewith. The opposite end of the sidewalls 42 and 44 adjacent the front of the box 14 rise at an angle away from the box for about three quarters of their height and then for the remaining height rise in a vertical direction. Attached to each one of the forward edges of the sidewalls 42 and 44 is a feed duct front wall 46. The bottom edges of each of the feed duct walls are connected to, and support a distribution box top cover 48. The distribution box cover 48 is a horizontally mounted flat plate transversely mounted to the feed duct and extending out symmetrically for a total length somewhat shorter than the length of each of the pans. The front 46 and rear walls 40 of the feed duct 36 are attached at their bottom edges to the front and rear edges of the cover 48.

The box cover front edge is straight from end to end and is perpendicular to the direction of the filter pans as they pass directly underneath it. The rear edge of the box cover is coextensive with the rear wall of the feed duct and extends horizontally at an acute angle with each of the feed duct sidewalls toward the ends of the cover which ends are parallel to each other. Three cutouts are formed in the top cover. The centrally located cutout in the cover is a slurry intake port 54 which is bounded by the feed duct rear wall 40 and part of each of the feed duct sidewalls 42 and 44, the intake port 54 extending at most only half way towards the front of the box. Slurry from the feed duct 36 passes into the box 14 via the intake port 54.

A pair of triangularly shaped access openings 56 and 58 are the remaining two cutouts in the box cover 48, and each extend outwardly in the cover from a point near the sidewalls where they abut the intake port 54. The access openings 56 and 58 as their name implies provide visual observation of the slurry in the box and access to the box for manual cleaning, maintenance and clearing purposes.

Extending downward from the outer edges of the box cover and coextensive therewith are vertical box sidewalls each abutting and being joined to its neighboring sidewall at their respective vertical edges. The box rear side wall 60 is joined at its top edge to the rear edge of the box cover and is therefore bent at the same angle as the top cover rear edge. A pair of box end walls 62 and 64 respectively are joined to the corresponding cover end at the top edge thereof and to the abutting ends of the rear sidewall 60 at their rear edges. The rear sidewall 60 and the two box end walls 62 and 64 extend downward to a box bottom 66. The box bottom 66 is a bent plate similar in dimensions and shape to the box cover 48 but having an upwardly inclined forward portion 67 formed by a slight upward longitudinal bend between the points when the rear bottom edges of the two end walls 62 and 64 abut the bottom 66. A uniform projection extending downwardly away from the front edge of the bottom 66 forms a lip 68 on the bottom front edge of the distribution box. A flat rectangular box front wall 70 is joined at its top to the front edge of the box cover 48 and at its ends to the front edges of the box end walls 62 and 64. The box front wall 70 extends downwardly only a portion of the distance to the bottom 66 and forms the upper edge 72 of a slurry discharge opening 74 in the box. The discharge opening 74 is also bounded on the bottom by the top edge of the lip 68 and at the sides by the front edge of the two box end walls 62 and 64.

Pivotally mounted to the top front end of the box 14 is a movable gate 76. The gate 76 is attached to the box by a hinge 77 mounted on the forward edge of the box cover 48 and extends downwardly toward the lip 68, where it is similarly bent away from box substantially parallel to the lip 68 as a rectilinear bend 78. Abutting the top of the rectilinear bend 78 is a triangular section 80 formed by an outward bend in the gate at a small acute angle from the corner of the top of the rectilinear bend 78 nearest the center of the filter 12. The area formed by the borders of the discharge opening 74 and the bottom of the hinged gate 76 establishes a variable discharge port 82 through which the flow of slurry onto each of the pan filter surfaces is obtained. The triangular section 80 of the gate as shown in FIGS. 4 and 5 of the drawings creates a progressive though minor increase in the size of the discharge port 82, this increase being largest at the point adjacent the greatest circumferential filter surface presented by the axially rotating vacuum filter 12. Such a construction therefore provides for larger discharge flow from the distribution box 14 onto the filter surfaces as the length of filter surface increases. For axially rotating tilting pan vacuum filters, such as described herein it is required that a level bed of slurry be obtained, since in order to extract the liquor from the slurry a vacuum is applied to the filtering surface. Unequal deposition of slurry onto the filter surface area will disturb this requirement and it is therefore a particular advantage of applicants' invention that this result is achieved where the aforesaid preferred vacuum filter is used. While FIG. 5 of the drawings shows a specifically illustrated tapered discharge port it should be understood that the inclination of the taper is dependent upon various factors which would make it inappropriate to herein establish limits for any particular taper. Such factors include for instance, the size and shape of the filter pans, the diameter of the circular path the filter pans follow, the density of the slurry or fluid, and the velocity of the moving pans passing under the distribution box.

Figure 3:
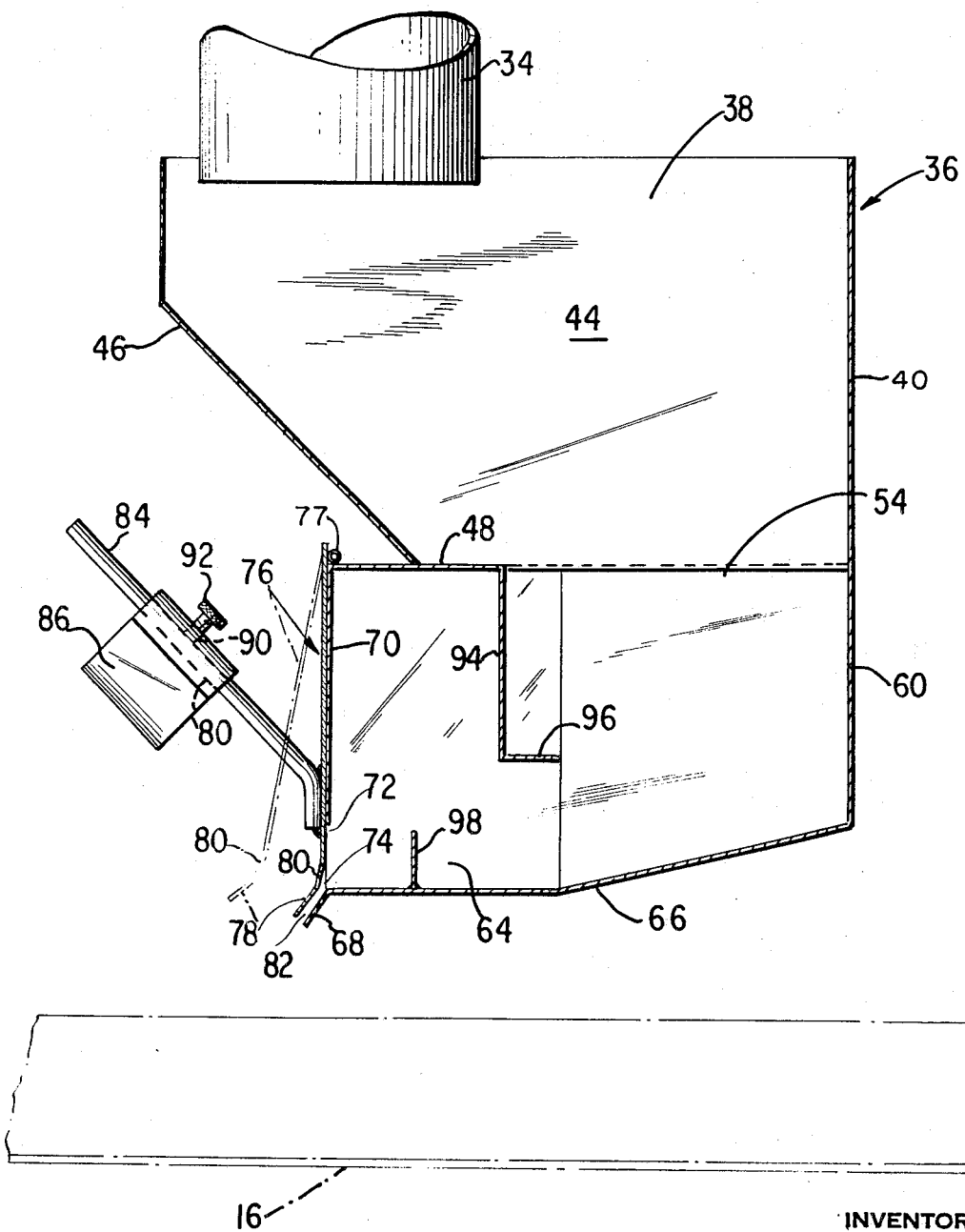
FIG. 3 of the drawing is a cross-sectional view of the distribution box taken along section 3–3 of FIG. 2.

Three equally spaced rods 84 are cantilevered at an upward 45° angle away from the gate 76. As shown in FIGS. 2 and 3, they are attached to the flat reverse side of the gate by welding, but any suitable attaching means may be used. Three counterweights 86 are each slidingly mounted, one on each of the rods 84. The counterweights 86 are solid cylindrical weights having a longitudinal hole 88 located in them which is slightly larger than the cross section diameter of the rods 84 so that the counterweight may be slidingly inserted onto the rod. An internally threaded hole 40 extends from the outside of the counterweight to the longitudinal hole 86 and a lock screw 92 is inserted into each of the threaded holes 90 to allow each of the counterweights to be adjustably but fixedly mounted at a predetermined point on each of the rods 84. The cantilevered counterweights 84 act to provide a force or bias forcing the hinged gate 76 to swing towards the discharge opening 74. It is thus readily apparent that the discharge port 82 will vary in size in response to the force of the slurry impinging on the gate and therefore provide a variable discharge port depending on feed volume and velocity.

In normal operation, plant production requirements may cause as much as 100 percent variation in feed volume to the filter. The bias applied to the hinged gate by the effect of the counterweights will therefore allow for variation in flow requirement while still providing proportioned flow over the whole area of the discharge port. The bias will also reduce to a minimum any variation in flow velocity and tend to provide a uniform minimum flow velocity onto the filter surface 20, being merely the velocity resulting from the potential energy inherent in the height of the discharge port 82 above the filter surface. Variations in velocity as well as high velocities of slurry flow onto the filter surface are undesirable, because the filter material is woven to a specified porosity and large variations in velocity would effect filter operation. Also a low velocity decreases the possibility of particles of slurry becoming embedded in the filter pores.

Mounted within the distribution box 14 is a baffle 94. The baffle 94 is a flat plate vertically attached to and supported by the cover 48 just forward of the slurry intake port 54 and extending from end to end in the box to a depth of approximately one half the full depth of the box. A horizontally flange 96 is attached to the rear wall of the baffle 92 at the bottom thereof. Also longitudinally mounted with the distribution box is a small vertical dispersion plate 98 attached to the box 66 at a point approximately midway between the box front wall 70 and baffle 94. The baffle 94 and dispersion plate 98 both act to distribute the volume of slurry over the whole length of the distribution box 14 and also to reduce the slurry velocity. It is felt that the baffle and dispersion plate would not be required if the internal volume of the distribution box were larger. Additionally the baffle and dispersion plate act to prevent excessive oscillation of the biased gate in response to changes in slurry flow.

A manually operated lever 100 is attached to the gate 76 and allows the discharge port 74 to be momentarily increased in size in order to flush out any large particles, for example scale, which may be trapped by the gate. It is of course an advantage of the distribution box that it is inherently self-cleaning for when the discharge port is restricted by large particles, the pressure head in the box will increase and automatically increase the size of the discharge port.

While the apparatus of this invention has been described with reference to the preferred embodiment thereof, it should be understood that various modifications are contemplated. For instance, springs or pneumatic loading may be substituted for the cantilevered counterweights described above. Therefore, having described the invention and wishing to cover those modifications and variations which would be apparent to those skilled in the art without departing from both the spirit and scope of the invention.

We claim:
1. In a filter apparatus having a plurality of horizontally mounted trapezoidally shaped filter pans moving in a circular and horizontal path, said pans having their short sides extending towards the center of the circular path, and a fluid distribution device mounted above said filter path, said fluid distribution device comprising:
   a box horizontally mounted above said filter path, said box having a flat side with a longitudinally coextending opening therein, said flat side and said opening being transversely positioned in relation to the filter path;

feed means for feeding fluid into the box, said feed means being communicatingly connected to said box;

a gate pivotally attached to the box and located in front of said opening, said gate comprising a flat rectangularly shaped plate having a triangularly shaped portion at the bottom thereof, said triangular portion being progressively inclined away from the opening and away from the center of said circular path; and biasing means for applying a force against the gate towards the opening whereby said gate is variably pivoted in response to the force of fluid impinging on the gate.

2. The apparatus of claim 1 wherein said biasing means are adjustable.

3. The apparatus of claim 2 wherein said adjustable biasing means comprises:

a plurality of rods cantilevered from the back of said gate and extending at a 45° angle away from said gate;
counterweights slidingly mounted on each of said rods; and
locking means for fixedly holding said counterweights to each of said rods.

4. The apparatus of claim 2 which additionally comprises baffle means for reducing the velocity of fluid mounted transversely to the fluid flow in said box to reduce the velocity of fluid flow in the box.

5. In a filter apparatus having a continuous filter moving in a circular and horizontal path, and a fluid distribution device mounted above said filter path, said fluid distribution device comprising:

a box horizontally mounted above said filter path, said box having a flat side with a longitudinally coextending opening therein, said flat side and said opening being transversely positioned in relation to the filter path;

feed means for feeding fluid into the box, said feed means being communicatingly connected to said box;

a gate pivotally attached to the box and located in front of said opening, said gate comprising a flat rectangularly shaped plate having a triangularly shaped portion at the bottom thereof, said triangular portion being progressively inclined away from the opening and away from the center of said circular path; and biasing means for applying a force against the gate towards the opening whereby said gate is variably pivoted in response to the force of fluid impinging on the gate.

6. The apparatus of claim 5 wherein said biasing means is adjustable.

7. The apparatus of claim 6 wherein said adjustable biasing means comprises:

a plurality of rods cantilevered from the back of said gate and extending at a 45° angle away from said gate;
counterweights slidingly mounted on each of said rods; and
locking means for fixedly holding said counterweights to each of said rods.

8. The apparatus of claim 6 which additionally comprises baffle means for reducing the velocity of fluid mounted transversely to the fluid flow in said box to reduce the velocity of fluid flow in the box.